United States Patent [19]

Roe

[11] Patent Number: 4,666,741

[45] Date of Patent: May 19, 1987

[54] COMPOSITIONS FOR THE FREEZE PROTECTION OF COAL SOLIDS

[75] Inventor: William J. Roe, Aurora, Ill.

[73] Assignee: Nalco Chemical Company, Oak Brook, Ill.

[21] Appl. No.: 854,648

[22] Filed: Apr. 22, 1986

[51] Int. Cl.⁴ .............................. B05D 7/00; C09K 3/11
[52] U.S. Cl. .......................................... 427/220; 44/6; 106/13; 252/70
[58] Field of Search .................. 44/6; 106/13; 252/70; 427/220

[56] References Cited

U.S. PATENT DOCUMENTS

| | | | |
|---|---|---|---|
| 3,928,221 | 12/1975 | Slater et al. | 106/13 X |
| 4,117,214 | 9/1978 | Parks et al. | 427/220 |
| 4,283,297 | 8/1981 | Peters et al. | 106/13 X |
| 4,470,827 | 9/1984 | Kekish et al. | 427/220 X |

Primary Examiner—Michael R. Lusignan
Attorney, Agent, or Firm—John G. Premo; Anthony L. Cupoli

[57] ABSTRACT

Certain blends of mono and diethylene glycol and ethers thereof, when combined in certain proportions with urea, are excellent freeze protection for moist coal solids.

2 Claims, No Drawings

COMPOSITIONS FOR THE FREEZE PROTECTION OF COAL SOLIDS

INTRODUCTION

The invention involves the use of combinations of polyols such as monoethylene or diethylene glycol with urea as freeze protectants for moist coal solids. Freeze conditioning agents are commonly sprayed on moist coal prior to rail shipment, in order to minimize handling problems caused by freezing during winter transport. The subject glycol/urea combinations are more cost-effective than many commercially used products, and it can be shown that a synergistic effect of the combination is the source of the desirable performance characteristics.

ADVANTAGES OF THE INVENTION

The most widely used freeze conditioning agents in the coal industry contain low molecular weight glycols. Glycol-based agents are considered attractive because of their reasonably good performance record, their negligible deleterious effects on the coal product, and their inherently low corrosivity. The subject invention is an improvement on the existing art in that it has been clearly shown that combinations of glycols and aqueous urea are at least as effective as the pure glycols, said mixtures being also substantially lower in cost. In short, the invention provides a means of substituting a large portion of the more expensive glycol in a product with a portion of extremely inexpensive urea, and maintaining at least the activity provided by higher glycol levels.

PRIOR ART

In U.S. Pat. No. 4,117,214 it is suggested that urea may be combined with ethylene glycol to provide a coal freeze prevention agent. However, a careful analysis of the data presented in this patent indicates that the combination on a 50% weight basis is little better than ethylene glycol when used alone.

THE INVENTION

A method of treating particulate solids to reduce the cohesive strength of such particulate solids when frozen when moisture is present thereon, which comprises applying to at least some of the surfaces of said particulate solids prior to freezing an effective amount of a composition comprising 35-60% by weight of a water-soluble glycol from the group consisting of mono and diethylene glycols and the mono and dimethyl and ethyl ethers thereof, from 5-35% by weight of urea, with the balance being water.

The glycols that may be used in the invention are ethylene glycol, diethylene glycol, as well as the mono and dimethyl and ethyl ethers thereof. The composition useful in the practice of the invention comprises 35-60% by weight of the glycol, from 5-35% by weight of the urea, with the balance being water.

A preferred glycol is diethylene glycol. A preferred composition is 40% by weight of diethylene glycol, 15% by weight of urea, with the balance being water.

The compositions are effective when sprayed at a dosage of from about 0.5 up to about 5 pints per ton of coal.

Typical compositions that were evaluated are set forth below in Table I.

TABLE I

FORMULATION GLOSSARY FOR EXAMPLES

| No. 1 | 70.0% Ethylene glycol |
| | 30.0% Water |
| No. 2 | 70.0% Diethylene glycol |
| | 30.0% Water |
| No. 3 | 40.0% Ethylene glycol |
| | 15.0% Urea |
| | 45.0% Water |
| No. 4 | 40.0% Diethylene glycol |
| | 15.0% Urea |
| | 45.0% Water |
| No. 5 | 40.0% Diethylene glycol |
| | 60.0% Water |
| No. 6 | 40.0% Diethylene glycol |
| | 60.0% Water |
| No. 7 | 15.0% Urea |
| | 85.0% Water |
| No. 8 | 50.0% Ethylene glycol |
| | 10.0% Urea |
| | 40.0% Water |

The results using the compositions of Table I and their effectiveness on frozen coal compression strength were evaluated using the following test method:

TEST METHOD

Samples of coal are passed through a ½ inch mesh screen and freeze release testing is carried out on the $-\frac{1}{2}$ inch fraction. Occasionally, narrower ranges in coal size consistency are used for more size uniformity and reproducibiliy. In any case, the top size of the coal samples used in freeze release testing is always $\leq \frac{1}{2}$ inch. If necessary, moisture may be added to the coal to increase its propensity to freeze. This is typically accomplished using a spray nozzle-tumbler arrangement so that water is applied in a fine mist as the coal is tumbling.

The larger coal sample is riffled into a number of 1,000 gm samples for treatment. These samples are placed into 1 gallon plastic jars and covered to prevent moisture loss. Liquid additives are sprayed on the samples using an air-atomizing nebulizer while the coal is tumbling in the plastic jars. The tumbling is accomplished by rolling the jars on a laboratory scale jar roller. (Solid additives may be sprinkled onto the coal and the samples tumbled in a similar manner.)

The treated coal is transferred to plastic cylinders (2⅝ inch ID × 3¾ inch L), shaken with a mechanical vibrator to ensure packing uniformity, and placed in a freezer for a given period of time. Typically the samples are stored at 0° F. overnight.

After the freezing period, the coal samples are removed from the plastic cylinders and the unconfined compression strengths measured using a Soiltest Model U164 Compression Strength tester. The more successful treatments result in frozen coal having smaller unconfined compression strengths.

Using the above test method, the results are set forth below in Table II:

TABLE II

PERFORMANCE EXAMPLES

| Treatment | Dosage | Frozen Coal Compression Strength | % Reduction in Strength Over Blank |
|---|---|---|---|
| (Eastern Steam Coal No. 1, $-\frac{1}{2}$ inch particles, 5.9% moisture) | | | |
| (Blank) | 0.0 pts/ton | 28.6 psi | — |
| Formulation #2 | 3.0 pts/ton | 21.4 psi | 25.2% |
| Formulation #4 | 3.0 pts/ton | 21.2 psi | 25.2% |
| Formulation #6 | 3.0 pts/ton | 28.6 psi | 0.0% |

TABLE II-continued

PERFORMANCE EXAMPLES

| Treatment | Dosage | Frozen Coal Compression Strength | % Reduction in Strength Over Blank |
|---|---|---|---|
| Formulation #7 | 3.0 pts/ton | 31.0 psi | (No reduction; net increase) |
| (Eastern Steam Coal No. 2, −½ inch particles, 7.2% moisture) | | | |
| (Blank) | 0.0 pts/ton | 49.2 psi | — |
| Formulation #1 | 3.0 pts/ton | 23.5 psi | 52.5% |
| Formulation #2 | 3.0 pts/ton | 19.0 psi | 61.4% |
| Formulation #3 | 3.0 pts/ton | 18.7 psi | 62.0% |
| Formulation #4 | 3.0 pts/ton | 16.8 psi | 65.8% |
| (Eastern Steam Coal No. 3, −½ inch particles, 5.7% moisture) | | | |
| (Blank) | 0.0 pts/ton | 34.9 psi | — |
| Formulation #1 | 2.0 pts/ton | 23.1 psi | 33.8% |
| Formulation #3 | 2.0 pts/ton | 20.0 psi | 42.4% |
| Formulation #8 | 2.0 pts/ton | 16.1 psi | 53.9% |

Having thus described my invention, I claim:

1. A method of treating particulate solids to reduce their cohesive strength when they are frozen which comprises:

applying to at least some of the surfaces of said particulate solids prior to freezing an effective amount of a composition from the group consisting essentially of 35–60% by weight of a water-soluble glycol from the group consisting of mono and diethylene glycols and the mono and dimethyl and ethyl ethers thereof, from 5–35% by weight of urea, with the balance being water.

2. The method of claim 1 where the water-soluble glycol is diethylene glycol.

* * * * *